United States Patent [19]

Komatsu et al.

[11] 4,166,807
[45] Sep. 4, 1979

[54] OXYGEN ABSORBENT

[75] Inventors: Toshio Komatsu, Tokyo; Yoshiaki Inoue, Mizumoto-Tizuka; Megumu Yuyama, Tokyo, all of Japan

[73] Assignee: Mitsubishi Gas Chemical Company, Inc., Tokyo, Japan

[21] Appl. No.: 855,316

[22] Filed: Nov. 28, 1977

[30] Foreign Application Priority Data

Dec. 8, 1976 [JP] Japan .................................. 51-147452

[51] Int. Cl.$^2$ ..................... B01J 27/02; B01J 31/02; B01J 27/14; B01J 27/20
[52] U.S. Cl. .............................. 252/439; 252/429 R; 252/437; 252/440; 252/443; 252/455 Z; 252/188; 252/191
[58] Field of Search ................... 252/429 R, 437, 440, 252/439, 443, 191, 188

[56] References Cited

U.S. PATENT DOCUMENTS

| 2,446,426 | 8/1948 | Layng | 252/439 X |
| 2,825,651 | 3/1958 | Loo et al. | 426/541 |
| 3,872,028 | 3/1975 | Rijnten et al. | 252/439 |
| 4,076,795 | 2/1978 | Tiethof | 252/188 X |

Primary Examiner—Delbert E. Gantz
Assistant Examiner—William G. Wright
Attorney, Agent, or Firm—Frishauf, Holtz, Goodman & Woodward

[57] ABSTRACT

An oxygen absorbent comprising iron and a metal halide, characterized in that the iron contains sulfur in an amount of from 0.05% to 5% on the basis of the weight of the iron is disclosed.

34 Claims, No Drawings

OXYGEN ABSORBENT

BACKGROUND OF THE INVENTION

This invention relates to improvement in an oxygen absorbent comprising iron and a metal halide.

In order to preserve foodstuffs, such as vegetables, fish, shellfish, meats, processed foodstuffs, such as potato chips, cakes, peanuts, etc., and so on, it is necessary to prevent the foodstuffs from getting moldy and from putrefying. Prior art methods have used freezer storage, cold storage, vacuum packaging and replacing the gas present in the inner part of packaging by an inert gas to prevent foodstuffs from getting moldy and putrefying. Additives, such as antioxidants, have been used for preserving foodstuffs. Recently, governments have started to regulate the use of additives in food, since it is realized that some additives are injurious to humans. The freezer storage method, requiring large-scale apparatus and complicated operation, is costly.

Molds or eumycetes, bacteria and higher organisms, such as insects, tend to disturb preservation of foodstuffs. These molds, eumycetes, bacteria and insects live and grow in the presence of oxygen and cause putrefaction and change in quality of foodstuffs.

Therefore, if oxygen can be selectively removed from the atmosphere in which the foodstuffs are packed, the problem of putrefaction and change in quality of foodstuff can be overcome, and it will become possible to preserve foodstuffs for a long time.

Attempts have been made for producing such an oxygen absorbent.

Japanese Patent Publication No. 19729/1972 discloses the use of an oxygen absorbent comprising hydrosulfite, calcium hydroxide, sodium bicarbonate, activated carbon and optionally water to preserve vegetables by removing oxygen from atmosphere.

U.S. Pat. No. 2,825,651 proposes a process for preparing an oxygen absorbent comprising mixing a finely divided sulfite and a finely divided metal salt, at least one of the two compounds having water of hydration or crystallization and compression-pelletizing the mixture in order to increase the rate of the oxidation of the sulfite.

British Pat. No. 553,991 discloses the steps of forming pilules comprising carbon and highly activated iron powder obtained by hydrogen treatment, followed by absorbing oxygen in a hood using the resulting pilules. Since iron powder contained in the pilules is highly active, the iron intensely reacts with oxygen in the container to remove oxygen therein. Since there is the possibility of fire when using such highly active iron powder, the process of British Pat. No. 553,991 is dangerous.

The present inventors have carried out wide research to find an oxygen absorbent not having such disadvantages. As a result, it was found that a metal powder alone has a slow oxidizing rate in air and is therefore not usable as an oxygen absorbent for preventing putrefaction of foodstuffs and change in quality of foodstuffs, and that even when the metal powder is mixed with water, the oxidizing rate thereof does not increase.

It was found that the mixture of a metal powder, a metal halide and water has rapid oxidizing rate. U.S. Ser. No. 816,134 filed on July 15, 1977 now U.S. Pat. No. 4,127,503 assigned to the assignee of this application discloses comprizing a metal powder and a metal halide coated thereon. However, it was found that though such oxygen absorbent comprising a metal powder and a metal halide has satisfactory oxygen-absorbing ability, evolution of small amount of hydrogen occurs during storage of the absorbent or when oxygen is absorbed. When a large amount of an oxygen absorbent is used in a closed container, this is dangerous, because there is possibility of evolution of hydrogen to the point of explosion.

SUMMARY OF THE INVENTION

The present inventors have carried out wide research to find an oxygen absorbent involving no risk from hydrogen-evolution but having sufficient oxygen-absorbing ability. We found that an oxygen absorbent comprising at least one metal halide and iron containing 0.05 to 5% by weight of sulfur on the basis of the weight of iron does not involve such risk from hydrogen evolution, but does have sufficient oxygen-absorbing property. This invention is formed on the basis of such discovery.

DETAILED DESCRIPTION OF THE INVENTION

The term "oxygen absorbent" means an agent for absorbing or removing oxygen.

The term "free water" means water not bonded to other components and excludes water of hydration.

It is critical that iron constituting the oxygen absorbent contain 0.05 to 5% by weight, preferably 0.1 to 1% by weight of sulfur on the basis of the weight of iron. A compound comprising a metal halide and iron containing less than 0.05% by weight of sulfur does not have the effect of suppressing evolution of hydrogen. A compound comprising a metal halide and iron containing more than 5% by weight of sulfur has disadvantage in respect of oxygen-absorbing ability. As shown in the following Examples and Comparative Examples, when the oxygen absorbent comprising a metal halide and iron containing 0.05 to 5% by weight of sulfur is used, evolution of hydrogen is suppressed to below 1/50th the evolution of hydrogen when a compound comprising a metal halide and iron containing less than 0.05% of sulfur is used. This eliminates risk of explosion from evolution of hydrogen. Iron constituting the oxygen absorbent may be in the form of powder, foil, fiber, chips or the like. In order to obtain sufficient contact with oxygen, it is preferable to have the maximum surface area of iron, so, use of iron powder of less than 10 mesh, preferably less than 50 mesh is advantageous. The mesh screen employed is Tyler Standard Sieve.

The sulfur content of iron prepared by a conventional process is less than 0.01% by weight. Therefore, in order to prepare iron containing 0.05 to 5% by weight of sulfur, it is necessary to add sulfur to iron as an additional step. Iron containing 0.05 to 5% by weight of sulfur may conveniently be prepared by a process comprising adding sulfur to iron during preparation of iron powder, a process comprising treating iron powder with $H_2S$ gas or a process comprising treating iron pieces with melt sulfur. Considering the properties of oxygen absorbent, iron obtained by adding sulfur to iron during preparation of iron powder is preferred.

The metals constituting the metal halides may be selected from the group consisting of alkali metals, alkali earth metals, copper, zinc, aluminum, tin, manganese, iron, cobalt and nickel. In order to avoid the generation of hydrogen, alkali metals, such as lithium, sodium, potassium and alkali earth metals, such as calcium, magnesium and barium are preferred. The halogens constituting the metal halides may be chlorine, bromine or iodine. One or more of the metal halides may be used in the present invention.

A process for mixing iron pieces with a metal halide may include a process comprising the step of merely adding one solid component to an other solid component, or a process comprising the step of mixing iron pieces with an aqueous solution of a metal halide and the step of drying the resulting mixture in air.

In the former process, upper limit of the amount of the metal halide is not critical, because the use of much metal halide does not impair the properties of the resulting oxygen absorbent. However, because the use of too much of the metal halide decreases the amount of oxygen absorbed per unit of absorbent, 0.1 to 300 parts by weight, preferably 1 to 100 parts by weight of the metal halide may be employed per 100 parts by weight of iron.

In the latter process, suitably 0.001 to 10 parts by weight of a metal halide, preferably 0.01 to 5 parts by weight of metal halide is employed per 100 parts by weight of iron. In both processes, when the proportion of metal halide employed is below the lower limit, the oxygen absorbing ability is lowered.

The oxygen-absorbing reaction by the oxygen absorbent of this invention utilizes reactions for forming hydroxides of iron. Therefore, it is essential that the oxygen absorbent contain water or a compound having water of hydration, or the system in which the oxygen absorbent is used contain steam. When the oxygen absorbent contains water, the water may be free water or water of hydration. Free water may be used in amount of more than 1 part by weight, preferably more than 5 parts by weight per 100 parts by weight of iron.

When compounds having water of hydration, such as $Na_2SO_4 \cdot 10H_2O$, $Na_2SO_3 \cdot 7H_2O$ and $Na_2CO_3 \cdot 10H_2O$ are used, the amount of the compounds used may be more than 2 parts by weight, preferably more than 10 parts by weight per 100 parts by weight of iron. The amount of free water or compounds having water of hydration may be decided by considering oxygen-absorbing ability per unit of oxygen absorbent. When the foodstuff contains water and evolves steam in a closed system, an oxygen absorbent comprising iron and a metal halide substantially free from water has sufficient action as an oxen absorbent.

The term "an oxygen absorbent substantially free from water" means that the water content of the absorbent is less than 1 part by weight per 100 parts by weight of iron.

The present oxygen absorbent comprises a metal halide and iron containing 0.05 to 5% by weight of sulfur and optionally water. But the oxygen absorbent may contain additives, such as fillers, binders, polyvalent alcohols and alkaline materials in order to increase the oxygen absorption rate and the amount of oxygen absorbed, to suppress evolution of hydrogen and/or to make handling of oxygen absorbent easy.

A filler may be added to the oxygen absorbent in order to increase the oxygen absorption rate and the amount of oxygen absorbed and to make handling of the oxygen absorbent easy. The fillers may include organic or inorganic fillers which have low solubility in water, such as active carbon, active alumina, active clay, diatomaceous earth, perlite, cellulose, zeolite, finely divided silica gel, alkali earth metal sulfates, kaolin, silicon nitride, colloidal silica, talc, bentonite, silica alumina gel, anhydrous silica, calcium silicate, gypsum, asbestos, magnesium oxide, natural graphite, aluminum hydroxide and iron oxides. One or more of the fillers may be used in the present invention. When free water is used as a water source, the amount of the filler having low solubility added is preferably above 0.2 parts by weight, more preferably above 0.5 parts by weight per 1 part by weight of the free water. When a compound having water of hydration is used as a water source, the amount of the filler added is preferably above 1 part by weight, more preferably above 3 parts by weight per 100 parts by weight of the compound having water of hydration. The amount of the fillers added is decided by considering the amount of oxygen absorbed per unit of oxygen absorbent.

A binder, a polyvalent alcohol and/or an alkaline material may be added to the oxygen absorbent in order to suppress evolution of hydrogen through oxygen absorbing reaction. One of these materials and mixture thereof may be used.

Suitably, the binders may include water soluble polymeric compounds, such as sodium alginate, carboxymethyl cellulose (CMC), hydroxymethyl cellulose, methyl cellulose, ethyl cellulose, propyl cellulose, sodium carboxymethyl cellulose, starch, polyvinyl alcohol (PVA), and tragacanth gum. One or more of the binders may be used in the present invention. When the binder is merely mixed with iron and the metal halide, the amount of the binder employed may be in the range of from 0.5 parts to 50 parts by weight, preferably, 1 part to 10 parts by weight per 100 parts by weight of iron. When the binder is coated on the surface of iron, the amount of the binder employed may be in the range of from 0.01 part to 10 parts by weight, preferably from 0.1 to 2 parts by weight per 100 parts by weight of iron.

The polyvalent alcohol employed in the present invention may include pentaerythritol, trimethylol propane, trimethylol ethane, glycerine, ethylene glycol, glucose, sucrose, mannitol and fructose. One or more of the polyvalent alcohols may be used in the present invention. When the polyvalent alcohol is merely mixed with iron and a metal halide, the amount of the polyvalent alcohol employed is 0.1 part to 50 parts by weight, preferably 1.0 part to 10 parts by weight per 100 parts by weight of iron. When the polyvalent alcohol is coated on the surface of iron, the amount of the polyvalent alcohol employed is 0.01 part to 10 parts by weight, preferably 0.1 part to 5 parts by weight per 100 parts by weight of iron.

Profitably, the alkaline materials employed in the present invention may include hydroxides, carbonates, sulfites, thiosulfates, phosphates, hydrogen phosphates or organic acid salts of alkali metals or of alkali earth metals. Examples of the alkaline materials include sodium hydroxide, sodium carbonate, sodium sulfite, sodium thiosulfate, sodium phosphate, sodium hydrogenphosphate, sodium citrate, sodium succinate, potassium hydroxide, potassium hydrogenphosphate, calcium hydroxide and calcium carbonate. One or more of the alkaline materials may be used in the present invention. When the alkaline material is merely mixed with iron and a metal halide, the amount of the alkaline material employed is 0.1 part to 20 parts by weight, preferably 0.1 part to 10 parts by weight per 100 parts by weight of iron. When the alkaline material is coated on the surface of iron, the amount of the alkaline material employed is 0.01 part to 10 parts by weight, preferably 0.1 part to 2 parts by weight per 100 parts by weight of iron.

It is critical that the oxygen absorbent comprise iron and a metal halide and optionally water. As occasion demands, inorganic or organic fillers, binders, polyvalent alcohols and/or alkaline materials may be added to the oxygen absorbent in order to improve the properties thereof.

The preparation of oxygen absorbent does not need specific means. When the present oxygen absorbent is prepared by merely mixing components constituting the oxygen absorbent, the weighed components are placed in a mixer, such as kneader, mixer, internal mixer, roll mill or gear compounder, and are blended therein. The order of the addition of components is not critical.

When the present oxygen absorbent is prepared by coating a metal halide and optionally a binder, an alkaline material and/or a polyvalent alcohol on the surface of iron, iron pieces are added to an aqueous solution of the component or the components followed by drying the resulting mixture. Alternatively, the aqueous solution is sprayed on iron pieces, followed by drying the pieces.

The oxygen absorbent so prepared can be used as it is, or the absorbent can be used in granular or tablet form.

The evolution of hydrogen in case of using or storing the present oxygen absorbent is less than 1/50th that in using or storing the prior oxygen absorbent. Therefore, there is no risk of explosion during use or storage of the present oxygen absorbent.

The present invention is further illustrated by the following Examples and Comparative Examples. However, this invention should not be limited by these examples and comparative examples. The percentages and parts in the Examples are based on weight unless otherwise specified.

EXAMPLE 1

A variety of oxygen absorbents were prepared by mixing 1 gr of Fe powder containing 0.2% of S and each of the metal halides shown in Table 1. Each of the oxygen absorbents in the amount as given in Table 1 was placed in a perforated polyethylene film-laminated paper bag. The bag and sanitary cotton impregnated with 10 ml of water were placed in a 1 l sealed container so as not to contact the cotton with the bag. The amount of oxygen absorbed was measured at 25° C. periodically. The results are shown in Table 1.

Table 1

| Run No. | Components of oxygen absorbent | | | Change in amount of oxygen absorbed with time (ml) | | | |
|---|---|---|---|---|---|---|---|
| | Fe powder (gr) | metal halide kinds | g | after 20 hrs | after 40 hrs | after 80 hrs | after 160 hrs |
| 1 | 1 | NaCl | 1 | 52 | 87 | 128 | 133 |
| 2 | 1 | NaBr | 1 | 43 | 73 | 113 | 134 |
| 3 | 1 | KI | 1 | 69 | 98 | 117 | 127 |
| 4 | 1 | CaCl$_2$ | 1 | 30 | 59 | 95 | 137 |

Change in the concentration of hydrogen evolved in the container with time is shown in Table 2.

Table 2

| Run No. | Change in concentration of hydrogen evolved in the container with time | | | |
|---|---|---|---|---|
| | after 5 days | after 10 days | after 40 days | after 60 days |
| 1 | 0.003% | 0.008% | 0.014% | 0.018% |
| 2 | 0.003% | 0.009% | 0.015% | 0.023% |
| 3 | 0.003% | 0.006% | 0.014% | 0.016% |
| 4 | 0.004% | 0.012% | 0.018% | 0.024% |

Comparative Example 1

The procedure of Example 1 was repeated except that iron powder containing less than 0.020% of S was used. The amount of oxygen absorbed with time and the concentration of hydrogen evolved in the container with time are shown in Table 3.

Table 3

| Change in amount of oxygen absorbed with time | | | | Change in concentration of hydrogen evolved in the container with time | | | |
|---|---|---|---|---|---|---|---|
| after 20 hrs | after 40 hrs | after 80 hrs | after 160 hrs | after 5 days | after 10 days | after 40 days | after 60 days |
| 33 ml | 61 ml | 99 ml | 126 ml | 0.4% | 0.9% | 3.8% | 5.2% |

It is apparent from Example 1 and Comparative Example 1 that evolution of hydrogen in case of using a component comprising a metal halide and iron containing less than 0.02% S is larger than evolution of hydrogen in case of using the present oxygen absorbent.

EXAMPLE 2

To 100 gr of Fe powder containing 0.2% of S was added 2 ml of a 20% aqueous solution of each of the metal halides as given in Table 4. When each of the resulting mixtures was blended sufficiently, the temperature of the mixture spontaneously rose to about 50°–60° C. through exothermic reaction, whereby the mixture was dried until its water content amounted substantially to zero. A variety of metal halide-coated metal powders were obtained. Each of the resulting powders in the amount as shown in Table 4 was placed in a perforated polyethylene film-laminated paper bag. The bag and sanitary cotton impregnated with 10 ml of water were placed in a 1 l sealed container so as not to contact the cotton with the bag. The amount of oxygen absorbed and concentration of hydrogen evolved were measured at 25° C. periodically. The results are shown in Table 4.

Table 4

| Run No. | Components of oxygen absorbent | | | Change in amount of oxygen absorbed with time (ml) | | | | Change in concentration of hydrogen evolved in the container with time (%) | | | |
|---|---|---|---|---|---|---|---|---|---|---|---|
| | Fe powder (gr) | metal halide kind | mg | after 20 hrs | after 40 hrs | after 80 hrs | after 160 hrs | after 5 days | after 10 days | after 40 days | after 60 days |
| 1 | 1 | NaCl | 4 | 89 | 115 | 140 | 166 | 0.001 | 0.003 | 0.007 | 0.009 |
| 2 | 1 | NaBr | 4 | 60 | 97 | 135 | 158 | 0.001 | 0.003 | 0.008 | 0.012 |
| 3 | 1 | KI | 4 | 80 | 111 | 137 | 162 | 0.000 | 0.002 | 0.006 | 0.008 |
| 4 | 1 | CaCl$_2$ | 4 | 96 | 117 | 141 | 166 | 0.001 | 0.004 | 0.009 | 0.013 |

Comparative Example 2

The procedure of Example 2 was repeated except that a 20% aqueous solution of NaCl and iron containing less than 0.020% of S were used. The results are shown in Table 5.

Table 5

| Components | Change in amount of oxygen absorbed with time (ml) | | | | Change in concentration of hydrogen in the container with time (%) | | | |
|---|---|---|---|---|---|---|---|---|
| | after 20 hrs | after 40 hrs | after 80 hrs | after 160 hrs | after 5 days | after 10 days | after 40 days | after 60 days |
| NaCl + Fe (less than 0.020% of s) | 45 | 133 | 155 | 156 | 0.004 | 0.031 | 1.45 | 2.81 |

After ten days have passed, the amount of hydrogen evolved increased strikingly. After 60 days have passed, the amount of hydrogen evolved was more than 100 times as high as that in Example 2.

EXAMPLE 3

Fe powder containing 0.5% of S, NaCl as a metal halide, free water or a compound having water of hydration as given in Table 6 and a filler which has low solubility in water as given in Table 6 were mixed. The amount of each component employed is given in Table 6. Each of the mixtures in the amount as given in Table 6 was placed in a perforated polyethylene film-laminated paper bag. The bag and sanitary cotton impregnated with 10 ml of water were placed in a 1 l sealed container so as not to contact the bag with the cotton. The container was left to stand at 25° C. The change in amount of oxygen in the container with time and amount of hydrogen evolved after 60 days were measured. The results are shown in Table 6.

Table 6

| Run No. | Components of absorbent and proportion | | | | | | Change in concentration of oxygen in the container with time (%) | | | | Concentration of hydrogen evolved after 60 days % |
|---|---|---|---|---|---|---|---|---|---|---|---|
| | Fe powder (g) | NaCl (g) | N₂O (g) | Compound having water of hydration (g) | Filler kinds | gr | after 5 hrs | after 10 hrs | after 20 hrs | after 30 hrs | |
| 1 | 2 | 2 | 0.4 | — | — | — | 15.9 | 10.3 | 20 | 0.0 | 0.043 |
| 2 | 2 | 2 | 0.4 | — | activated carbon | 1 | 0.5 | 0.1 | 0.0 | 0.0 | 0.068 |
| 3 | 2 | 2 | 0.4 | — | silica | 2 | 14.1 | 8.2 | 0.0 | 0.0 | 0.038 |
| 4 | 2 | 2 | 0.4 | Na₂SO₄ . 10H₂O(2g) | — | — | 20.3 | 18.1 | 10.6 | 0.2 | 0.022 |
| 5 | 2 | 2 | 0.4 | Na₂SO₃ . 7H₂O (2g) | gypsum | 1 | 18.2 | 14.0 | 3.9 | 0.0 | 0.021 |
| 6 | 2 | 2 | 0.4 | Na₂CO₃ . 10H₂O(2g) | diatomaceous earth | 1 | 20.1 | 17.6 | 8.5 | 0.5 | 0.015 |

EXAMPLE 4

0.4 gr of NaCl and 0.2 gr of each of the binders as given in Table 7 were dissolved in 40 ml of water. To the mixture was added 100 gr of Fe powder containing 0.8% of S. The resulting mixture was mixed sufficiently and was dried at 80° C. under reduced pressure of 10 mmHg until its water content amounted substantially to zero. Each of the resulting dried powders in the amount as given in Table 7 was placed in a perforated polyethylene film-laminated paper bag. The bag and sanitary cotton impregnated with 10 ml of water were placed in a 1 l sealed container so as not to contact the bag with the cotton. The container was left to stand at 25° C. The concentration of oxygen in the container after 30 hours and the concentration of hydrogen evolved in the container after 60 days were measured. The results are shown in Table 7.

Table 7

| Run No. | Components of absorbent and proportion | | | | Concentration of oxygen in container after 30 hrs (%) | Concentration of hydrogen in container after 60 days (%) |
|---|---|---|---|---|---|---|
| | Fe powder (g) | NaCl (mg) | Binder Kind | mg | | |
| 1 | 2 | 8 | sodium alginate | 4 | 0.0 | 0.0038 |
| 2 | 2 | 8 | CMC | 4 | 0.0 | 0.0015 |
| 3 | 2 | 8 | polyvinyl alcohol | 4 | 0.1 | 0.0018 |

EXAMPLE 5

In 100 ml of water were dissolved 0.6 gr of NaCl and 0.1 gr of each of the alkaline materials as given in Table 8. To the resulting solution was added 100 gr of Fe powder containing 0.1% of S. The resulting mixture was mixed by stirring. The mixture was heated to 100° C. in a nitrogen atmosphere to dry the mixture until its water content amounted substantially to zero.

Two grams of each of the resulting metal halide and alkaline material coated metal powder was placed in a perforated polyethylene film-laminated paper bag. The bag and sanitary cotton impregnated with 10 ml of water were placed in a 1 l sealed container so as not to contact the bag with the cotton. The container was left to stand at 25° C. The oxygen concentration after 30 hours and the hydrogen concentration after 60 days were measured. The results are shown in Table 8.

Table 8

| Run No. | Alkaline material | Oxygen concentration after 30 hrs (%) | Hydrogen concentration after 60 days (%) |
|---|---|---|---|
| 1 | NaOH | 0.1 | 0.0016 |
| 2 | Na₂SO₃ | 0.0 | 0.0009 |
| 3 | Na₂PO₄ | 0.0 | 0.0021 |
| 4 | Ca(OH)₂ | 0.1 | 0.0022 |
| 5 | Na₂S₂O₃ | 0.0 | 0.0018 |
| 6 | sodium citrate | 0.0 | 0.0010 |

EXAMPLE 6

Two grams of NaCl and 5 gr of pentaerythritol were dissolved in 50 ml of water. To the resulting solution was added 100 gr of Fe powder containing 0.5% of S. The resulting mixture was mixed by stirring. The mixture was filtered through Nutsche filter paper to obtain cake-like material. The material was dried at 60° C. at reduced pressure of 20 mmHg until its water content amounted substantially to zero. The proportion of NaCl and pentaerythritol adhering to the powder were 0.41% and 1.0%, respectively.

Two grams of the resulting powder was placed in a perforated polyethylene film-laminated paper bag. The bag and sanitary cotton impregnated with 10 ml of water were placed in a 1 l sealed container so as not to contact the bag with the cotton. The container was left to stand at 25° C. The concentration of oxygen in the container after 30 hours was 0.0%, and the concentration of hydrogen in the container after 60 days was 0.0005%.

EXAMPLE 7

0.8 gr of $BaCl_2.2H_2O$ and 0.5 gr of sucrose were dissolved in 20 ml of water. To the resulting solution was added 100 gr of Fe containing 0.3% of S. The resulting mixture was mixed by stirring. The mixture was heated at 50° C. in air to dry the mixture until its water content amounted substantially to zero.

Two grams of the resulting powder was placed in a perforated polyethylene film-laminated paper bag. The bag and sanitary cotton impregnated with 10 ml of water were placed in a 1 l sealed container so as not to contact the bag with the cotton. The container was left to stand at 25° C. The concentration of oxygen in the container after 30 hours was 0.0%, and the concentration of hydrogen in the container after 60 days was 0.0008%.

EXAMPLE 8

To 100 gr of Fe powder containing 0.3% of S was added 50 ml of a 1% aqueous solution of NaCl, and the resulting mixture was mixed sufficiently and dried at 50° C. under reduced pressure to 20 mmHg until its water content amounted substantially to zero. NaCl coated Fe powder was obtained. Two grams of the resulting powder was placed in a perforated polyethylene film-laminated paper bag. The bag and bread were placed in a 500 ml sealed container. The container was left to stand at 25° C. The oxygen concentration in the container was measured periodically. Results are shown in Table 9.

Table 9

| Number of hours passed | 10 hrs | 20 hrs | 30 hrs | 30 days |
|---|---|---|---|---|
| Oxygen concentration % | 11.6 | 1.9 | 0.0 | 0.0 |

The concentration of hydration in the container after 30 days was 0.023%.

As a control, only bread was left to stand in a sealed container at 25° C. without applying any oxygen absorbent thereto.

Growing of mold and taste of bread by organoleptic test were observed in Example 8 and control. The taste was evaluated by the following five ratings:

| Ratings | | | | |
|---|---|---|---|---|
| 5 | 4 | 3 | 2 | 1 |
| Good taste | | ⟵⟶ Bad taste | | spoiled |

Moldiness of the test bread was evaluated by the following four degree scale.

| Ratings | |
|---|---|
| − | No mold |
| + | Slight mold |
| ++ | Considerable mold |
| +++ | Substantial amount of mold |

The results in Example 8 and control are shown in Table 10.

Table 10

| Number of days passed | Example (oxygen absorbent was used) | | Control (no oxygen absorbent was used) | |
|---|---|---|---|---|
| | mold | taste | mold | taste |
| 4 | − | 5 | − | 3 |
| 8 | − | 5 | + | 1 sour odor |
| 12 | − | 4 | ++ | 1 putrefactive odor |
| 30 | − | 3 | +++ | 1 putrefactive ordor |

EXAMPLE 9

To one hundred gr of Fe powder containing 0.2% of S was added 50 ml of a 0.2% aqueous solution of $CaCl_2$, and the resulting mixture was mixed sufficiently and dried at 40° C. under reduced pressure of 40 mmHg until its water content amounted substantially to zero. The $CaCl_2$ coated Fe powder was obtained. The resulting powder was placed in a perforated polyethylene film-laminated paper bag. The bag and each of the following foodstuffs were placed in a 500 ml sealed container and left to stand for testing the preservation of the foodstuff. Only one of each of the foodstuffs was left to stand in the sealed container as control test.

Growing of mold on the foodstuffs and taste thereof were tested as in Example 8.

Table 11

| Sponge cake (Preserving temperature was 25° C.) | | | | |
|---|---|---|---|---|
| Number of days passed | Example 9 (oxygen absorbent was used) | | Control (no oxygen absorbent was used) | |
| | mold | taste | mold | taste |
| 4 | − | 5 | − | 3 |
| 8 | − | 5 | − | 2 |
| 12 | − | 4 | + | 1 |
| 30 | − | 3 | +++ | putrefaction |

Table 12

| Strawberries (preserving temperature was 5° C.) | | |
|---|---|---|
| Preservation days | Example 9 (oxygen absorbent was used) | Control (no oxygen absorbent was used) |
| | taste | taste |
| first day | 5 | 5 |
| second day | 5 | 3 |
| third day | 5 | 1 |

Table 12-continued

Strawberries (preserving temperature was 5° C.)

| Preservation days | Example 9 (oxygen absorbent was used) taste | Control (no oxygen absorbent was used) taste |
|---|---|---|
| fourth day | 4 | 1 |

Table 13

Sweet chestnuts (25° C.)

| Duration of preservation | Example 9 (oxygen absorbent was used) mold | taste | Control (no oxygen absorbent was used) mold | taste |
|---|---|---|---|---|
| 1st day | — | 5 | — | 5 |
| 5th day | — | 5 | — | 2 |
| 10th day | — | 4 | ± | 2 |
| 15th day | — | 4 | + | 1 |
| 20th day | — | 4 | ++ | 1 |

EXAMPLE 10

One hundred grams of Fe powder containing less than 0.02% of S was immersed in water, hydrogen sulfide gas was blown in the water containing Fe powder. The resultant Fe powder was washed with water. The Fe powder was added to 20 milliliters of a 20% aqueous solution of NaCl. The resulting mixture was dried at 50° C. at reduced pressure of 10 mmHg until its water content amounted substantially to zero. The sulfur content of the resulting powder was 2.1% by weight.

One gram of the powder was placed in a perforated polyethylene film-laminated paper bag. The bag and sanitary cotton impregnated with 10 milliliters of water were placed in a 1 l sealed container so as not to contact the bag with the cotton. The container was left to stand at 25° C. The amount of oxygen absorbed and the concentration of hydrogen in the container were measured periodically. The results are shown in Table 14.

Table 14

| Change in amount of oxygen absorbed with time | | | | Change in concentration of hydrogen evolved in the bag with time | | | |
|---|---|---|---|---|---|---|---|
| after 20 hrs | after 40 hrs | after 80 hrs | after 160 hrs | after 5 days | after 10 days | after 40 days | after 60 days |
| 72 ml | 139 ml | 152 ml | 163 ml | 0.001% | 0.002% | 0.006% | 0.008% |

EXAMPLE 11

To each of three samples of 100 gr of Fe powders containing less than 0.020% of S was added 0.05 gr, 0.5 gr or 5 gr of S, respectively. These samples were heated on oil bath to melt the sulfur so it would adhere on the surface of Fe powder particles. Each of the sulfur coated Fe powders was added to 2 milliliters of a 20% aqueous solution of NaCl and each of the resulting mixtures was mixed sufficiently, the temperature of the mixture spontaneously rose to about 50°–60° C. through exothermic reaction, whereby the mixture was dried until its water content amounted substantially to zero.

Two grams of each of the resulting powders was placed in a perforated polyethylene film-laminated paper bag. The bag and cotton impregnated with 10 milliliters of water were placed in a 1 l sealed container so as not to contact to the bag with the cotton. The containers were left to stand at 25° C. The concentration of oxygen in the container after 30 hours and the concentration of hydrogen in the container after 60 days was measured. The results are shown in Table 15. For comparison, the above procedure was repeated using Fe powder without a sulfur coating. The result is shown in Table 15 as control.

Table 15

| Run No. | Components | | | Concentration of $O_2$ in the container after 30 hrs | Concentration of $H_2$ in the container after 60 days |
|---|---|---|---|---|---|
| | Fe powder | NaCl | S | | |
| 1 | 2 g | 8 mg | 1 mg | 0.0% | 0.58% |
| 2 | " | " | 10 mg | 0.0% | 0.02% |
| 3 | " | " | 100 mg | 0.0% | 0.02% |
| control | " | " | — | 0.0% | 4.66% |

What is claimed is:

1. An oxygen absorbent comprising iron containing sulfur in an amount of from 0.05 to 5% based on the weight of iron, and at least one metal halide, in an amount of from 0.001 to 300 parts by weight per 100 parts by weight of the iron.

2. The oxygen absorbent as defined in claim 1 wherein the iron contains 0.1 to 1% by weight of sulfur on the basis on the weight of the iron.

3. The oxygen absorbent as defined in claim 1 wherein the iron is in the form of powder, foil, fiber or chips.

4. The oxygen absorbent as defined in claim 1 wherein the iron is in the form of powder.

5. The oxygen absorbent as defined in claim 1 wherein the absorbent is prepared by mixing the iron with solid metal halide.

6. The oxygen absorbent as defined in claim 5 wherein the amount of the solid metal halide is in the range of from 0.1 to 300 parts by weight per 100 parts by weight of iron.

7. The oxygen absorbent as defined in claim 5 wherein the amount of the metal halide is in the range of from 1 to 100 parts by weight per 100 parts by weight of iron.

8. The oxygen absorbent as defined in claim 1 wherein the absorbent is prepared by mixing the iron with an aqueous solution of the metal halide.

9. The oxygen absorbent as defined in claim 8 wherein the amount of the metal halide is in the range of from 0.001 to 10 parts by weight per 100 parts by weight of iron.

10. The oxygen absorbent as defined in claim 8 wherein the amount of the metal halide is in the range of from 0.01 to 5 parts by weight per 100 parts by weight of iron.

11. The oxygen absorbent as defined in claim 1 wherein the absorbent is substantially free from water.

12. The oxygen absorbent as defined in claim 1 wherein the absorbent further contains water.

13. The oxygen absorbent as defined in claim 12 wherein the amount of water is more than 1 part by weight per 100 parts by weight of iron.

14. The oxygen absorbent as defined in claim 12 wherein the amount of water is more than 5 parts by weight per 100 parts by weight of iron.

15. The oxygen absorbent as defined in claim 1 wherein the absorbent further contains at least one compound having water of hydration.

16. The oxygen absorbent as defined in claim 15 wherein the compound having water of hydration is selected from the group consisting of $Na_2SO_4.10H_2O$, $Na_2SO_3.7H_2O$, $Na_2CO_3.10H_2O$ and mixtures thereof.

17. The oxygen absorbent as defined in claim 15 wherein the amount of the compound having water of hydration is more than 2 parts by weight per 100 parts by weight of iron.

18. The oxygen absorbent as defined in claim 15 wherein the amount of the compound having water of hydration is more than 10 parts by weight per 100 parts by weight of iron.

19. The oxygen absorbent as defined in claim 1 wherein the absorbent further contains at least one filler which has low solubility in water.

20. The oxygen absorbent as defined in claim 19 wherein the filler is selected from the group consisting of active carbon, active alumina, active clay, diatomaceous earth, perlite, cellulose, zeolite, finely divided silica gel, alkali earth metal sulfates, kaolin, silicon nitride, colloidal silica, talc, bentonite, silica aluminagel, anhydrous silica, calcium silicate, gypsum, asbestos, magnesium oxide, natural graphite, aluminum hydroxide, iron oxides and mixtures thereof.

21. The oxygen absorbent as defined in claim 1 wherein the absorbent further contains at least one binder.

22. The oxygen absorbent as defined in claim 21 wherein the binder is selected from the group consisting of sodium alginate, carboxymethyl cellulose (CMC), hydroxymethyl cellulose, methyl cellulose, ethyl cellulose, propyl cellulose, sodium carboxymethyl cellulose, starch, polyvinyl alcohol (PVA), tragacanth gum and mixture thereof.

23. The oxygen absorbent as defined in claim 21 wherein the amount of the binder is in the range of from 0.01 to 50 parts by weight per 100 parts by weight of iron.

24. The oxygen absorbent as defined in claim 1 wherein the absorbent further contains at least one polyvalent alcohol.

25. The oxygen absorbent as defined in claim 24 wherein the polyvalent alcohol is selected from the group consisting of pentaerythritol, trimethylol propane, trimethylol ethane, glycerine, ethylene glycol, glucose, saccharose mannitol, fructose and mixtures thereof.

26. The oxygen absorbent as defined in claim 24 wherein the amount of the polyvalent alcohol is in the range of from 0.01 to 50 parts by weight per 100 parts by weight of iron.

27. The oxygen absorbent as defined in claim 1 wherein the absorbent further contains at least one alkaline material.

28. The oxygen absorbent as defined in claim 27 wherein the alkaline material is selected from the group consisting of hydroxides, carbonates, sulfites, thiosulfates, phosphates, hydrogenphosphates and organic salts of alkali metals and hydroxides, carbonates, sulfites, thiosulfates, phosphates, hydrogenphosphates and organic acid salts of alkali earth metals and mixtures thereof.

29. The oxygen absorbent as defined in claim 27 wherein the amount of the alkaline material is in the range of from 0.1 to 20 parts by weight per 100 parts by weight of iron.

30. The oxygen absorbent as defined in claim 1, wherein said at least one metal halide is selected from the group consisting of alkali metal halides, alkali earth metal halides, copper halides, zinc halides, aluminum halides, tin halides, manganese halides, iron halides, cobalt halides and nickel halides.

31. The oxygen absorbent as defined in claim 30, wherein said metal halide is selected from the group consisting of metal chlorides, metal bromides and metal iodides.

32. The oxygen absorbent as defined in claim 30, wherein said metal halide is a halide selected from the group consisting of lithium, sodium and potassium.

33. The oxygen absorbent as defined in claim 31, wherein said metal halide is a halide selected from the group consisting of lithium, sodium and potassium.

34. The oxygen absorbent as defined in claim 30, wherein said metal halide is a halide selected from the group consisting of calcium, magnesium and barium.

* * * * *